Feb. 14, 1950   J. A. PATTERSON   2,497,136
VAPOR-LIQUID CONTACTING UNIT
Filed Aug. 27, 1946

John A. Patterson Inventor
By _____ Attorney

Patented Feb. 14, 1950

2,497,136

UNITED STATES PATENT OFFICE 2,497,136

VAPOR-LIQUID CONTACTING UNIT

John A. Patterson, Beverly, N. J., assignor to Standard Oil Development Company, a corporation of Delaware Application August 27, 1946, Serial No. 693,180

1 Claim. (Cl. 261—114)

This invention relates to improvements in vapor-liquid contacting towers, and in particular to an improved plate design.

In the treatment of petroleum stocks to obtain crude products for subsequent refining treatment for the production of gasoline, kerosene and lubricating oils, fractionation and stabilization are particularly important. Usually, the crude products are fractionally distilled so as to obtain fractions of prescribed boiling ranges, that is, so as to contain certain constituents and exclude other constituents of undesirable vapor pressure characteristics. In such processing, thorough contact between vapor and liquid during fractionation is necessary for the obtaining of high grade products. For this purpose, bubble cap trays have been extensively used. The bubble cap trays, however, do not give a particularly high order of efficiency and in their construction and cleaning many problems are presented. The present invention is concerned with improved equipment for effecting contact between vapor and liquid during passage through the tower.

It is an object of the invention to furnish a fractionation tower in which improved contacting between vapor and liquid is attained during passage through the tower. A further object of the invention is to simplify and improve the construction and arrangement of the contacting devices in fractionating towers. Other objects of the invention will be appreciated by the following description and illustration of a particular embodiment.

Figure 1:
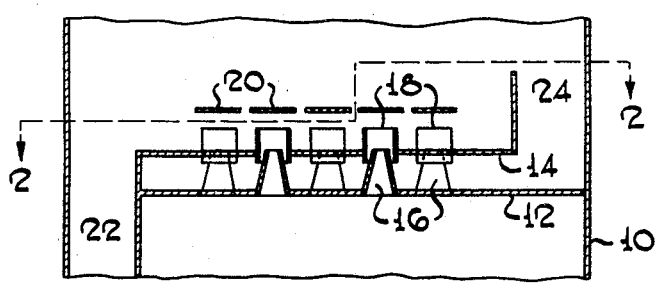
Figure 2:
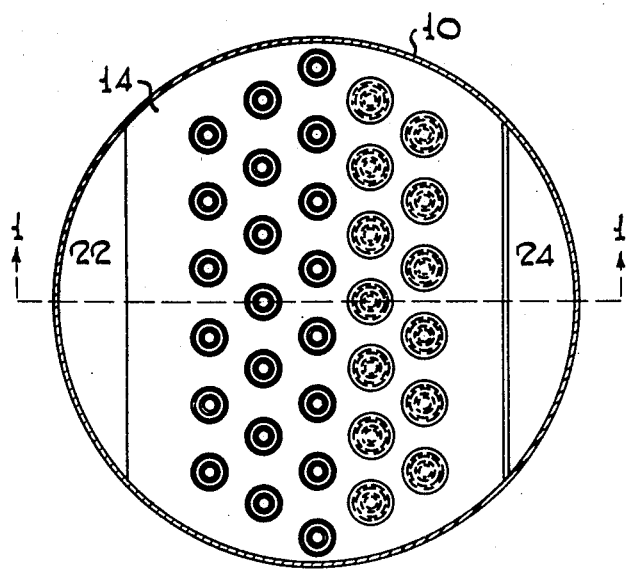

In the drawings, Figure 1 presents a vertical cross-sectional view of a fractionating tower containing plates designed according to the invention. Figure 2 presents a plan sectional view of two plates in a fractionating tower designed according to the invention.

In the fractionating tower designed according to the invention, vertically spaced horizontally arranged plates of special design are employed. The plates may, but usually do not, extend completely across the tower. The space in the tower is thus filled by a number of superimposed compartments determined by the specially designed plates of the invention. These plates are usually horizontally arranged some distance from the side of the tower at least at some point to form at least one peripheral downcomer for each plate, that is, to permit overflow of liquid into the next lower compartment in the tower. These peripheral downcomers are arranged between the peripheries of the various plates and the side of the tower so as not to be one above the other, that is, distributed around the inside of the tower to ensure the passage of the liquid from the plate above to the plate below and avoid channelling effects.

The plates of the invention consist of two types arranged in parallel pairs suitably vertically spaced throughout the tower for efficient operation. In this paired relationship, the lower plate is fitted with a number of nozzles or jets while the upper plate has short tubes or risers each concentrically located over a nozzle or jet on the lower plate. The compartments between paired plates may differ appreciably from those between respective members of the paired combination depending upon the fluids undergoing treatment. The tubes or risers on the upper plate project sufficiently above the plate to prevent any substantial quantity of liquid from running downward through the openings. These short tubes or risers in the upper plate are similar to the throats of Venturi devices. Particularly where high liquid flows are desired, the risers may be shaped, as in a venturi, to increase the ratio of liquid to vapor carried through the riser. Each tube or riser is surmounted some distance from its upper open end by a horizontal plate which functions as a deflecting baffle for the liquid-laden vapor arising out of the tubes or risers.

The nozzles or jets in the lower plate of the paired combination of plates throughout the tower are the means through which the rising vapors pass. The spaces around and between the jets on these plates are filled during use with liquid flowing downward from the plate above. The tubes or risers in the upper plates, functioning in a manner similar to the throats of Venturi devices, entrain with the vapors flowing through, the liquid from the surrounding area. By such arrangement, vapor and liquid become intimately mixed.

The mixture of liquid and vapor, after passing through the riser, contacts the deflecting baffle located immediately above. The contact of the liquid suspension in the vapor against the baffle causes deflection in a horizontal direction resulting in the disengagement of the vapor from the liquid. The lower plate is supplied with liquid by means of the downcomer from the plate above. The liquid which collects on the upper plate is carried off by means of the downcomer to the plate below.

Since adequate contacting of the vapor and liquid is obtained in passing through the device, cross flow is not necessary. When the plates are large, multiple downcomers may be used in order to achieve better distribution of the liquid to the lower plates and to facilitate removal of the liquid to the upper plates.

In order that the invention may be more fully understood, the following description and illustration of a particular embodiment are presented.

In Figures 1 and 2, one set of paired plates 12 and 14 comprising a unit are shown in the shell of the tower 10. Similar paired plates are equally spaced throughout the tower 10 in number as desired for the degree of fractionation for which the tower 10 is specifically constructed. The extent of the compartment or the space between the groups of the paired plates is dependent upon the type of fluids undergoing fractionation. Similarly, the distance between the individual plates in a paired combination is dependent somewhat on the fluids undergoing treatment and the relative flows of liquid and vapor. The plates 12 and 14 are shown as extending only partly across the tower 10. The spaces 22 and 24 between the peripheries of the plates and the tower function downcomer facilities for plates not particularly shown in the drawings in accordance with the distribution of such facilities to contribute in the movement of the liquid throughout the tower without channelling.

The lower plate 12 contains nozzles or jets 16. The upper plate 14 is shown as being fitted with a number of short tubes or risers 18 immediately above which are located baffles 20.

The plates designed according to the invention have advantages over conventional bubble cap plates in providing more intimate contact between the vapor and the liquid. The design also avoids channelling in the tower and permits high vapor and/or liquid throughput for a given tower diameter. The plates are also of simple construction and can be more easily cleaned than the conventional bubble cap plates.

What is claimed is:

In a vapor liquid contacting tower the improvement which comprises: a pair of horizontally disposed, vertically spaced plates within the tower, the upper of said plates being terminated adjacent one side of said tower by a juncture with a first vertical partition extending upwardly from the said upper plate thereby forming a first liquid downcomer passageway between the said tower and the said first vertical partition, the upper of said plates being terminated adjacent the opposite side of the tower by a juncture with a second vertical partition extending downwardly from said upper plate thereby forming a second liquid downcomer passageway between the said tower and the said vertical partition, the lower of said plates being terminated adjacent one side of said tower by juncture with the said second vertical partition, said plates further being characterized by a plurality of vertically aligned perforations, the perforations of said lower plate being fitted with nozzles extending upwardly to the level of the upper plate, the perforations of said upper plate being equipped with risers concentrically located in relation to the said nozzles and extending above and below said upper plate, the diameter of said nozzles and said risers being proportioned to effect intimate contact of vapor and liquid, and each of said risers being surmounted by a horizontally disposed baffle plate located above the upper open end of each of said risers.

JOHN A. PATTERSON.

REFERENCES CITED

The following references are of record in the file of this patent:

UNITED STATES PATENTS

| Number | Name | Date |
|---|---|---|
| 1,741,519 | Huff | Dec. 31, 1929 |
| 2,150,498 | Geddes et al. | Mar. 14, 1939 |
| 2,222,565 | Kraft | Nov. 19, 1940 |
| 2,345,667 | Hachmuth | Apr. 4, 1944 |